United States Patent [19]
Williams

[11] Patent Number: 6,052,333
[45] Date of Patent: Apr. 18, 2000

[54] METHOD FOR SEISMIC ANTENNA ILLUMINATION OF SUBTERRANEAN FEATURE FOR DISPLAY AND EVALUATION

[75] Inventor: Kenneth Edward Williams, Houston, Tex.

[73] Assignee: Texaco Inc., White Plains, N.Y.

[21] Appl. No.: 08/411,245

[22] Filed: Mar. 27, 1995

Related U.S. Application Data

[63] Continuation of application No. 08/260,278, Jun. 14, 1994, abandoned, which is a continuation-in-part of application No. 07/965,326, Oct. 23, 1992, abandoned.

[51] Int. Cl.$^7$ .................................................. G01V 1/00
[52] U.S. Cl. .................. 367/49; 367/37; 367/59
[58] Field of Search .................... 181/111, 112; 367/37, 49, 59, 60, 61, 63

[56] References Cited

U.S. PATENT DOCUMENTS

| | | | |
|---|---|---|---|
| 2,906,363 | 9/1959 | Clay, Jr. | 367/56 |
| 3,066,754 | 12/1962 | Johnson | 367/49 |
| 3,221,297 | 11/1965 | Smith et al. | 367/49 |
| 3,881,168 | 4/1975 | Farr et al. | 367/49 |
| 4,758,998 | 7/1988 | Johnson et al. | 367/58 |

*Primary Examiner*—Ian J. Lobo
*Attorney, Agent, or Firm*—Harold J. Delhommer; William J. Beard

[57] ABSTRACT

Monofrequency continuous wave signals of long duration are used as inputs form sources of known characteristics and location. These signals are reflected off subterranean features and serve to paint the features for display and evaluation. A primary feature is the use of continuous wave, long duration signals as opposed to the standard short pulse technique.

4 Claims, 6 Drawing Sheets

METHOD FOR SEISMIC ANTENNA ILLUMINATION OF SUBTERRANEAN FEATURE FOR DISPLAY AND EVALUATION

CROSS REFERENCE TO RELATED APPLICATION

The present application is a continuation of application Ser. No. 08/260,278, filed Jun. 14, 1994, now abandoned, which is a continuation-in-part of my earlier application Ser. No. 07/965,326 filed Oct. 23, 1992, and now abandoned.

BACKGROUND OF THE INVENTION

1. The Field of the Invention

The present invention relates to a method and apparatus for using seismic antennas to illuminate subterranean features for display and evaluation, and in particular to a new and novel approach to this problem utilizing continuous wave techniques.

2. The Prior Art

The seismic method, as practiced today, takes advantage of many elements of basic earth physics. There are, however, some basic physical principles and techniques that are not actively pursued in the current 3D and Common Depth Point based seismic methodologies. The present invention investigates what different combinations of sources, receivers, processing and display parameters could take advantage of some of the other elements of physics which we are not currently emphasizing. For example, interferometry is a technique which has been utilized in other branches of science for many years. It has not been routinely applied to the acquisition of seismic data to date because the current techniques of seismic data acquisition and processing do not favor the method. Interferometry is a technique that could yield directional data in a way significantly different from the current 3D or CDP methods. It would require consideration of different sources, receivers, processing methods and parameters.

A relatively new technique developed in the science of radio and optical astronomy is the procedure of non-redundant masking. This computer-intensive procedure has been shown to dramatically increase the signal to noise ratio and the angular resolution of the data by a factor of twenty.

Consideration of these two concepts, and development of the resulting ideas, has led to the definition of a potentially useful new system of acquiring, processing and interpreting seismic data. In essence, the subject method proposes to "illuminate" a region of subsurface with long duration monofrequency seismic signals of known characteristics and location. The reflections of these signals would then be detected by a highly direction-sensitive antenna array. Full-wave, three-component signals would be recorded at each antenna element of the array. The source would be moved from place to place to create a 3D illumination of the region. The data would be processed to remove unwanted noise and to increase signal strength. Computation of the 3D velocity field of the Earth filter would allow the correct interpretation of the overall dataset.

SUMMARY OF THE INVENTION

The proposed technique uses long duration, monofrequency input sources of known characteristics and location. The signal is passed through the Earth filter and is completely recorded as full-wave, 3-component seismic signals at each element of a highly directional surface receiver antenna of known geometry and characteristics. None of the individual components of the above description are unique by themselves. All are components of existing methodologies. Furthermore, the induction and acquisition of a signal has no value if useful information cannot be extracted from the received data.

The present invention is a method and apparatus for display and evaluation of subterranean formations. At least one seismic source is used to "illuminate" subterranean formations of a region by directing continuous wave signals into the earth from known locations. These signals are reflected off the subterranean formations and detected by an array of antenna. The collected data is processed to remove unwanted noise and increase signal strength and a 3D tomographic display is created.

BRIEF DESCRIPTION OF THE DRAWINGS

The present invention will now be described, by way of example, with reference to the accompanying drawings in which.

DETAILED DESCRIPTION OF THE PREFERRED EMBODIMENT

The present invention includes data acquisition, requiring both a signal source and receivers, data processing, and interpretation and evaluation of the data. Each of these four aspects of the invention will be discussed below in terms of "illuminating" the subterranean features with the continuous wave signals.

The signal sources for the data acquisition can be known seismic input sources such as a plurality of standard seismic vibrator trucks, each operating at a constant, individually assigned frequency. They may all be operating at the same frequency, or each may be separately assigned a distinct individual frequency. The analog here would be individual monofrequency light sources, each illuminating the same region.

The ultimate solution would be to have a multifrequency (white noise) seismic signal which could operate for long duration. Currently seismic trucks operate with constantly changing frequency over a specified bandwidth. Other conventional sources provide short pulses rather than being constant signal transmitters. This grouping of individual single frequency sources is a best compromise and the methodology described below is based on the use of this source input signal.

The vibrators should operate at each surface location for a long period of time at a constant frequency. How long would depend on the earth properties at a given site and the objectives of the survey. The vibration time would vary from about five minutes to over a half hour. Recording of the signal for the purposes of this invention would not begin until steady-state conditions had been reached, whereby enough time would have been allowed for the initial receipt of all desired signals from the subsurface. This will usually be at least fifteen seconds, depending on the depth to all targeted objectives. Recording of the signal would begin and continue for a time sufficient to integrate the signal to be able to successfully image the faintest reflectors that are of interest in the survey. This may be as much as thirty minutes or more and would, again, depend on the objectives of the survey.

The source elements (vibrator trucks) are much more mobile than the surface receiver array. Thus the source elements can be moved after the completion of the recording of the data at each vibration point. This allows for a large surface area and a large subsurface volume to be illuminated by such movement and is somewhat similar to what is done in the current 3D acquisition methods. This mobility would be used to obtain multiple surface signal source sites for each fixed receiver site. These multiple surface signal source sites would preferably be located in as many directions and distances from the surface receiver as would be possible.

Following the acquisition of signals from multiple surface source locations, the receiver antenna array would be moved to a new site and acquisition would begin anew to acquire multiple surface source illuminations. In this way linear or regional area coverage could be obtained.

Figure 1:
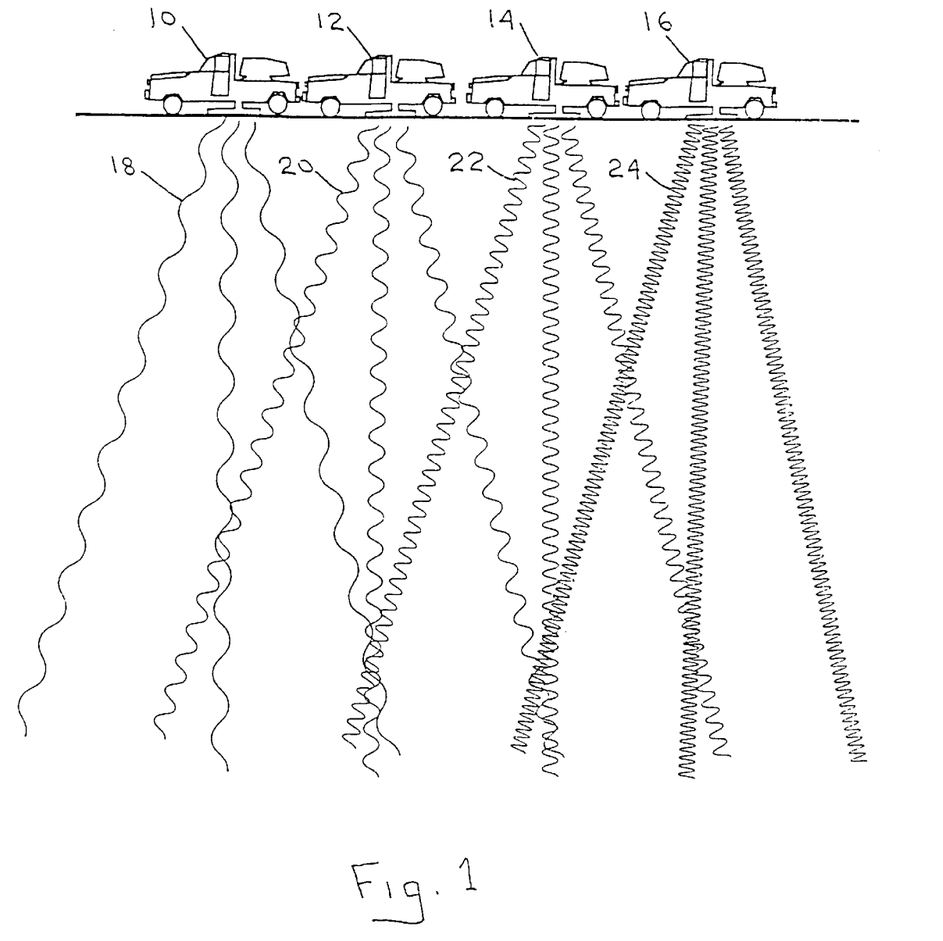
FIG. 1 is a diagrammatic representation of a plural vibration sources.

FIG. 1 shows four known seismic vibrator input source units 10, 12, 14, 16, preferably truck mounted units for mobility. Each source unit will vibrate an individually preassigned constant frequency 18, 20, 22, 24, respectively, for a preassigned long duration time interval. Some or all of the source units may, in selected instances, vibrate at the same frequency for the long duration time interval in areas where a stronger input signal is desired.

The surface elements of each receiver are preferably a plurality of full-wave multidirectional receiver geophones. Significant mode conversion occurs at interface boundaries. Full-wave recording of received signals should yield interpretable information whether the source is pure P-wave or shear wave. All of the data received and recorded by this method that is not noise is the result of the source signal being passed through the Earth filter. All P-wave and shear wave received signals are the result of the processes that occur in this complex filter. Full wave recording will allow the identification of those processes if the signal is properly processed to recover the data.

Each receiver element preferably records continuous data (or as close to continuous data as is possible) for the entire vibration time interval. It may be necessary to equip each receiver element with its own separate memory system and to collect the recorded signal from each geophone individually at the end of each illumination session. Due to the length of each illumination session, it may be necessary, on the other hand, to simultaneously collect and record data from all elements of the antenna array on a multichannel system at a central recording and monitoring station.

It would be especially important, at the outset of the testing of the system, to record as complete a record of the received signal as is possible. Any small portion of the data that is received, after steady-state conditions have been established, should contain information from all portions of the illuminated region in a way similar to the interference patterns produced on film in holography. Variations in the direction of receipt of the returned signal will be represented by very small time delays in the recorded signal. It is important that all of this detail is preserved in the recording of the data. Once experience is gained with the system, it may be possible to selectively sample the data signal at a wider interval without adversely affecting the dataset.

Figure 2A:
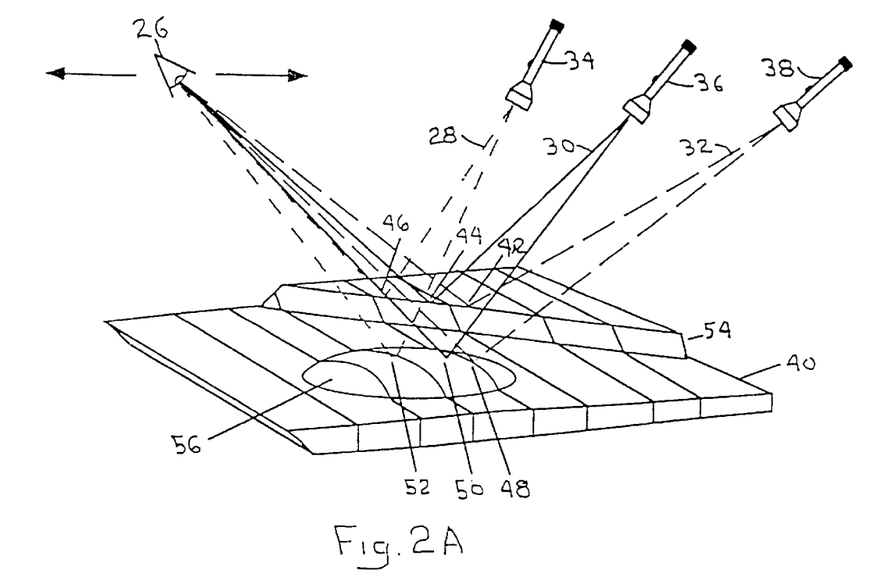
FIG. 2A is a diagrammatic illustration of a visual analog to the present invention.

FIG. 2A represents a visual analog to the subject invention. A mobile receiver 26 (the eye) detects light of specific wavelengths 28, 30, 32 which were generated by flashlights 34, 36, 38, respectively, each of which has been fitted with known filter means (not shown) so as to produce monofrequency light. The light is reflected off the earth model 40, for example at points 42, 44, 46, 48, 50 and 52. Points 42, 44 and 46 are reflected from the upthrown side of the fault 54 and points 48, 50 and 52 are reflected off the domal uplift. It is clearly understood that these are only representative points for simplicity of the drawing.

Figure 2B:
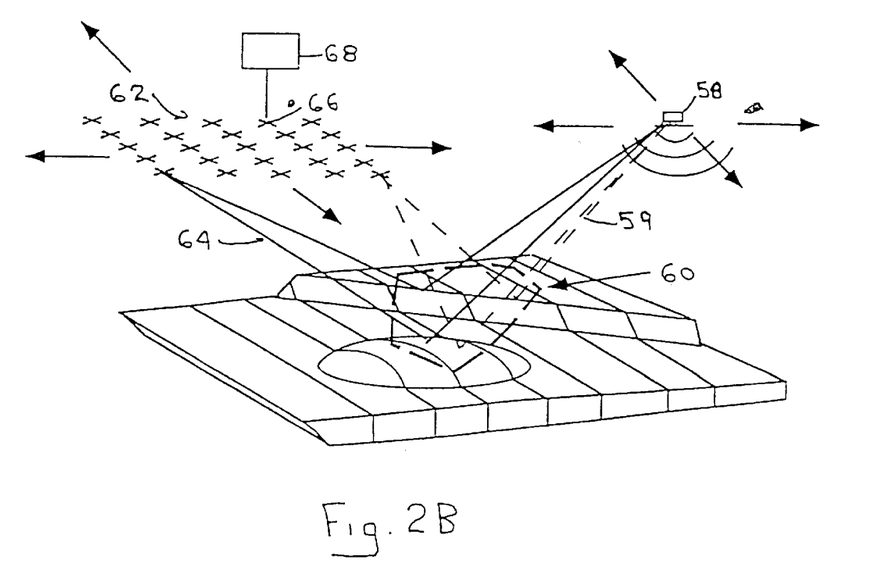
FIG. 2B is a diagrammatic illustration of the concept of the present invention.

FIG. 2B shows the present invention. A movable seismic source 58 generates monofrequency long duration signals 59 which are modified by earth filter and reflected from various features in the subsurface model 60. Those reflected signals 64 with raypaths that allow detection by the receiver antenna array 62 are recorded at the surface. Each antenna element in the array, 66 for example, should be a full wave multi-directional receiver geophone. Each element in the array would be connected to a recording device 68 that would store the full signal as detected at the element. This device does not necessarily need to be located physically near the receiver.

Each receiver would preferably be positioned such that it would constitute element in a large antenna array. The design of specific antenna arrays is a well researched area in radio astronomy and in the seismic industry. The primary difference in concept between the traditional seismic receiver array and the present invention is in how the data is handled at the receiver. In traditional seismic systems, the receiver array is designed in such a way as to maximize signal strength and to minimize extraneous unwanted noise. The output from small clusters of geophones is added together to increase signal strength. This is then added together with the other elements of the array to minimize noise such as ground roll and wind noise, for example.

The present invention would record all data received at each antenna element. Every attempt would be made to obtain a clean, complete signal at each antenna element. The data for each element would be collected at a central facility and numerically processed to increase the signal to noise ratio and to extract directional, amplitude, angular resolution, polarity and velocity data from the received signal.

Each element in the receiver antenna would be located geometrically and its spacial position to each other receiver element and to the source position would be determined as precisely as possible.

Every two elements in the antenna array could be considered as a dipole pair for the purposes of the analysis of the data. Therefore, there would be a large number of dipole pairs of different geometries as all possible combinations of pairs in the antenna are considered. Proper geometric positioning is therefore critical to sorting out all of this data.

Every set of three elements would be considered to be a part of a tripole antenna for the purposes of the analysis of this data. Directional and noise reduction sensitivity is enhanced by the use of simultaneous tripole and dipole analysis of the data.

The proposed technique uses long duration, monofrequency input sources of known characteristics and location. The signal is passed through the Earth filter and is completely recorded as full-wave, 3-component seismic signals at each element of a highly directional surface receiver antenna of known geometry and characteristics. None of the individual components of the above description are unique by themselves. All are components of existing methodologies. Furthermore, the induction and acquisition of a signal has no value if useful information cannot be extracted from the received data.

The combination of the above components into a system whereby useful information may be extracted from the received signal is felt to be unique, distinct, useful and operational.

Figure 3A:
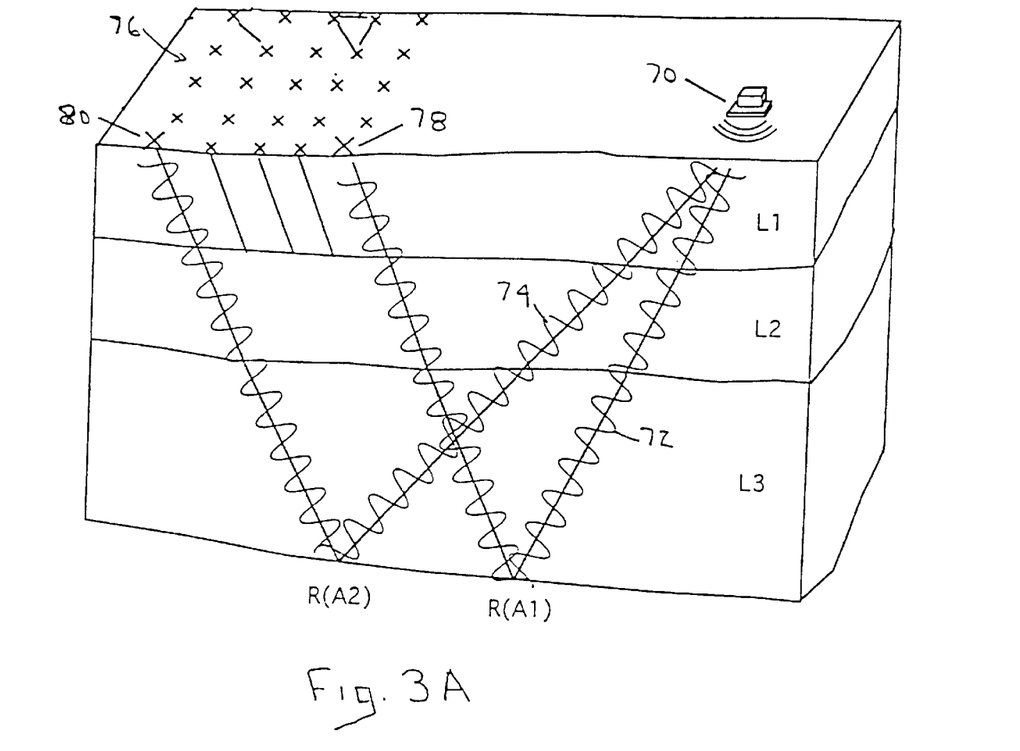
FIG. 3A schematically illustrates a typical source and antenna array configuration.

FIG. 3A depicts a typical source 70 and antenna array 76. Long duration, monofrequency signals 72, 74 are being produced by the source and are being reflected by a typical impedance contrast interface at the base of layer L3. The signals are received and recorded by the individual antenna elements, such as 78, 80. Each element is a portion of an antenna dipole and also an antenna tripole.

Figure 3B:
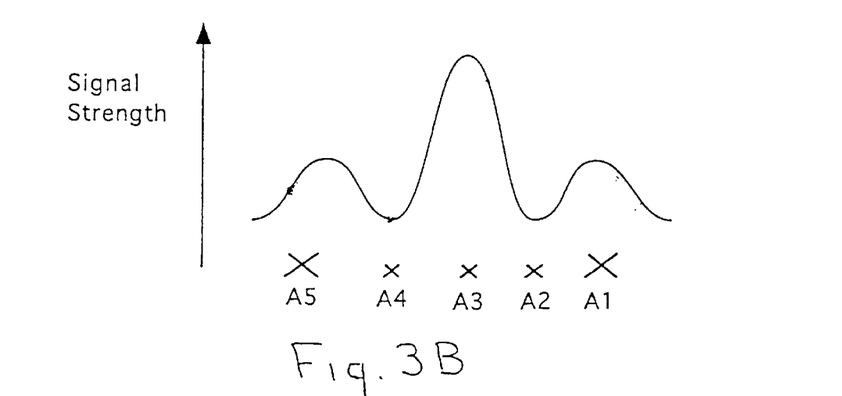
FIG. 3B illustrates the change in signal strength across one set of antenna dipoles.

FIG. 3B illustrates the change in signal strength across one set of antenna dipoles from antenna elements 72, 74 due to a change in the distance which the raypath has travelled though the earth filter and due to the effects of changing velocities and densities along its path length. This is using the effects of spherical divergence to mimic the astronomical technique of interferometry which is based on planar input wavefronts.

In consideration of just the first part of the system as described above, several examples of the use of similar seismic sources have been proposed, for example U.S. Pat. Nos. 3,066,754 (Johnson); 3,221,297 (Smith et al); 3,881, 168 (Farr et al.); and 4,914,636 (Garotta). Each of these patents differs significantly from the present invention. Johnson uses a constant frequency input pulse that is shorter that the time required for the wave energy to be reflected back to the surface from the subsurface interval of interest (about 0.25 sec.). Smith et al require that a steady monofrequency input signal be inputted for a short time period, just long enough to record the phase and amplitude of the recovered signal at each input frequency. A seismic trace is then constructed from the resulting data. Farr et al. use a short time-period monofrequency source which is lowered progressively down a borehole to compare with a surface source to determine the phase of the received signal as filtered through the earth. Garotta uses multiple sources, but not monofrequency (each vibrates with a frequency spectrum in a specific frequency band) and recombines the data in the processing to produce a trace. The portion of the received seismic signal that is of interest in the subject method is of no interest to any of the above referenced prior art, or to any of the current commonly employed techniques of 2D or 3D acquisition methodologies. In the subject method, we begin to collect all of the received signal for subsequent analysis after a period of fifteen or more seconds has passed from the initiation of signal input, and the signal will be collected for a period of minutes from each receiver.

The main focus of the various methods of seismic geophysics to date has been to determine the sonic travel time from source to reflector to receiver, and the amplitude, phase and frequency of the received signal. The acquisition, processing and display of the data is oriented towards reducing noise by various methods and to enhancing the acquired signal for best interpretation. The subject method proposed here is not concerned with, and does not even require collection of, data on the signal travel time from source to receiver. The technique would collect and analyze the full dataset of three component signals received from monofrequency, long duration input signals of known location and characteristics, by an array of receivers, also of known location. All signals received at each detector are either the result of the input signal having passed through the earth filter, or the result of various noise sources. Noise could then be intentionally processed away. The velocity field of the illuminated zone could be directly solved, both vertically and horizontally and for both p- and shear waves.

The source vibrators would be running at a constant frequency for a long time interval. This time interval would be longer than the two-way time that would be required for returns to be made from the deepest reflector of interest in the survey. A steady state is the objective. This will occur when the source is generating signal and the subsurface is being fully illuminated by that signal. At this point, each reflector or other source of a signal recorded at an antenna array element could be essentially assumed to be its own source for the seismic signal received by the antenna array. It is at this point that any given portion of the data, of a given time interval longer than several wavelengths, would contain all of the potentially retrievable data from that point. The data segment would be an almost unintelligible mass of primary reflections and interference patterns of the same wavelength from all of the reflectors and refractors within reach of the seismic sources. A key part of this invention is the technique to extract usable information from this dataset.

Figure 4:
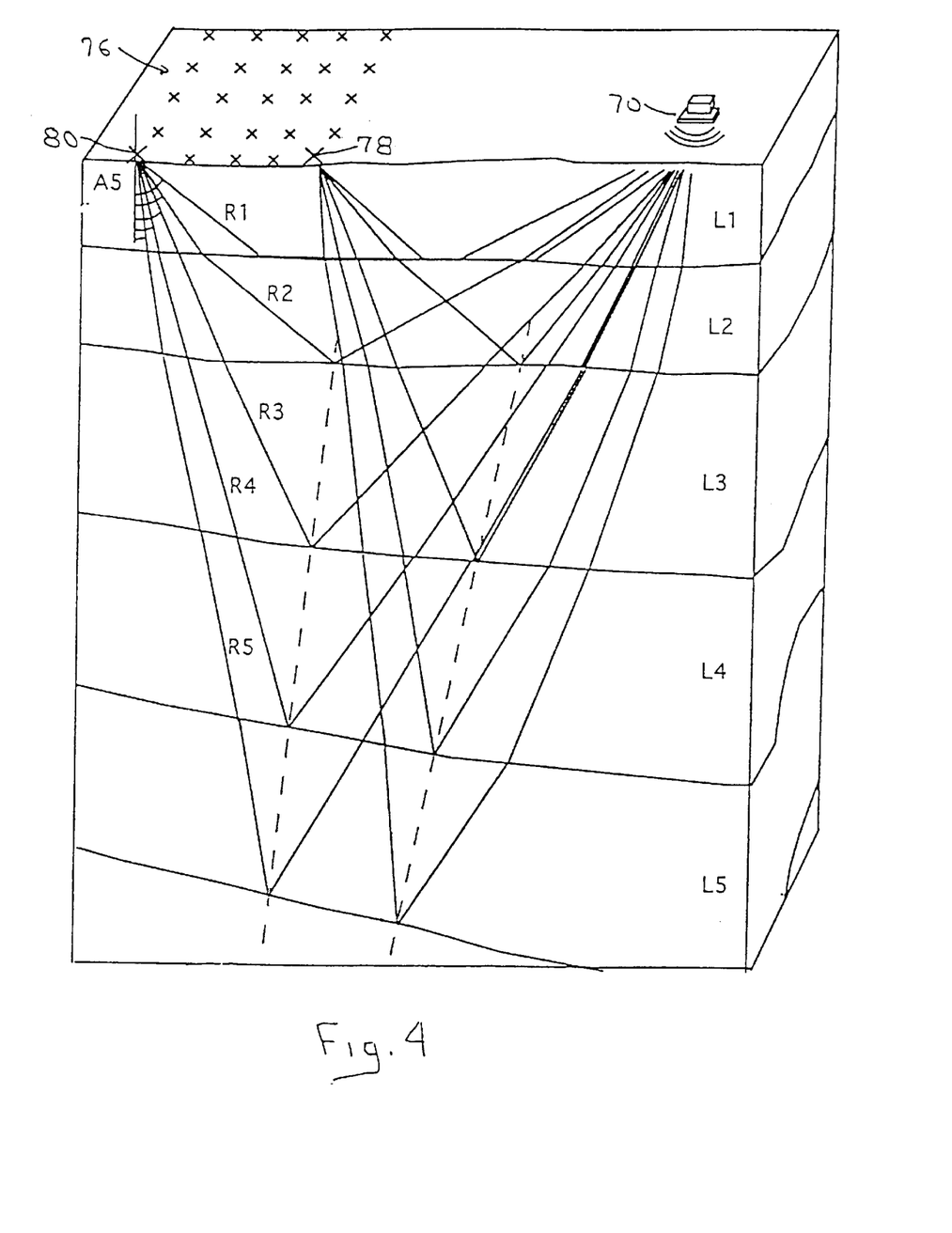
FIG. 4 is a simplified illustration of the steady state condition.

FIG. 4 illustrates a simplified version of the condition at steady state where the source 70 has illuminated the subsurface layers with monofrequency long duration signals which are being received at the antenna array 76. All signals from all raypaths (R1 through R5, for example) are being received and recorded at the same time at each antenna element, 78 or 80 for example. The area illuminated by a specific source-antenna combination decreases with depth. Any movement of the surface source will increase this subsurface illumination area.

This same problem, much more complex, is solved on a continuing basis, instantaneously, by the eye as it processes visual data from all directions and from all wavelengths to derive a coherent picture of the world, see FIG. 2A. Mathematical solutions to this problem have been derived in radio and optical astronomy. This knowledge should be readily applicable to seismic data, given the changes in signal application and acquisition described herein. A short summary of the basic processing steps which might be required are outlined below.

Each receiver pair within the antenna array would be processed as part of a separate, distinct interferometry pair. The number of possible pairs in an antenna array would depend on the total number of array elements but would always be large.

Each element in the antenna array would be assigned in the data processing stage of evaluation, to a separate processor in a parallel processing computer. The processing of the massive volumes of data and the nature of the data evaluation procedure outlined below would necessitate, and actually would be much simplified by the use of massively parallel processing techniques. The entire array and its whole dataset would be processed simultaneously, much as the eye and the brain process the entire visual dataset simultaneously to provide an image of the environment.

Figure 5:
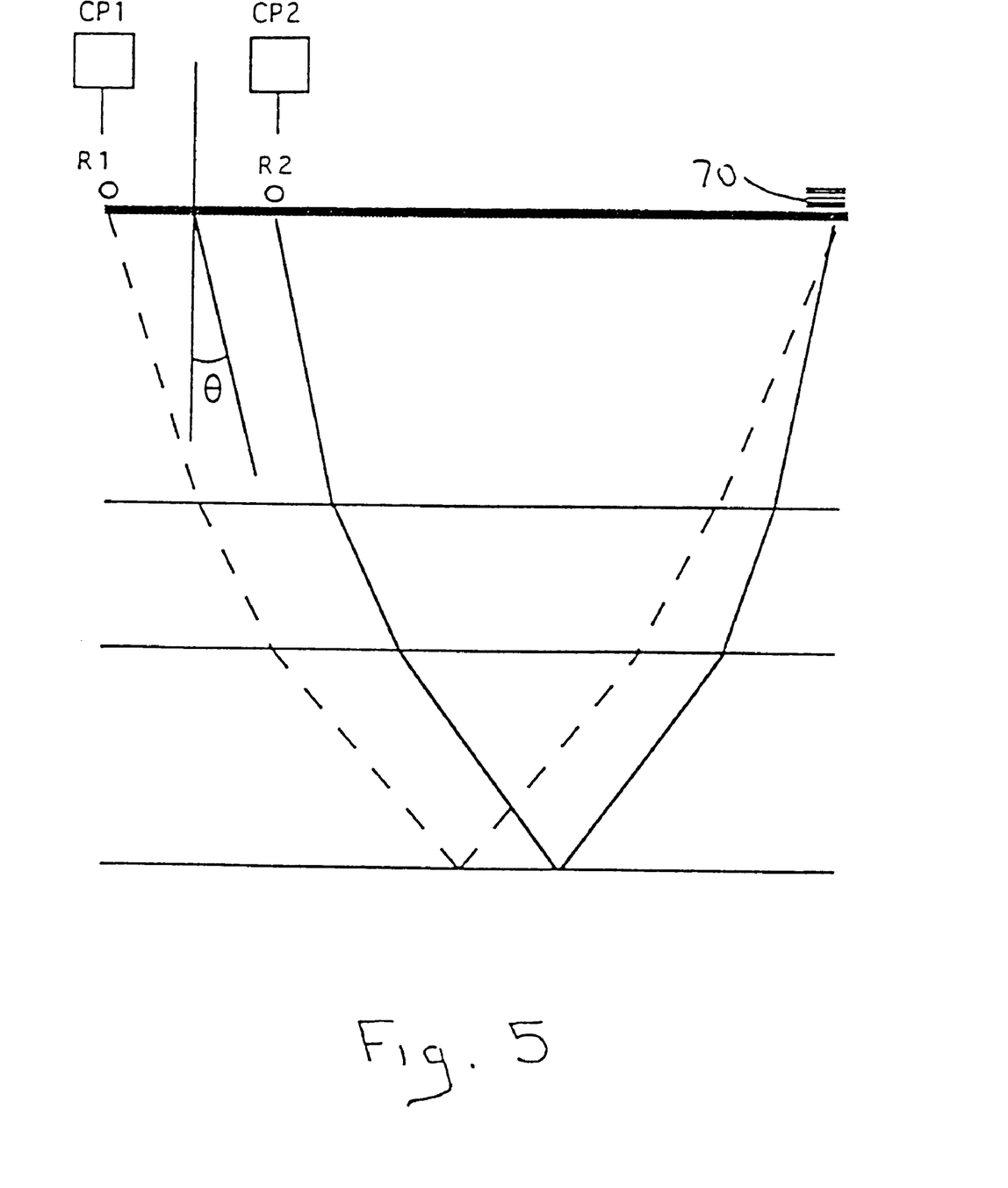
FIG. 5 is a diagrammatic representation of the cross-correlation of the signals in accordance with the present invention.

Each receiver of the antenna array would be processed as part of a distinct interferometry pair (R1 and R2 in FIG. 5 for example). Cross-correlation of the recorded signal from each will yield a time delay which, given the velocity which solves the geometries of the system, would be converted to a direction θ. All the recorded signals from each antenna element would be processed as part of a parallel processing computer (not shown) and would be assigned an individual processor CP1 and CP2 for the cross-correlations and calculations The key technique in data processing would be to cross-correlate the signals from each element in the receiver dipole with its matched pair. The time interval to be compared would be the signals received at each element beginning at exactly the same instant of clock time and continuing for the same length of time. As one signal is shifted, ever so slightly in time relative to its companion, a correlation function would be computed. This correlation function would spike at a high value when the signals are in phase. The amplitude of the spike would be proportional to the signal strength. The time offset or delay would correspond to the angle between the oncoming raypath of the received signal and the line of the investigated dipole elements.

Another technique in analyzing this dataset would be to identify a unique signal from the dataset that correlates to a reflector from a specific impedance contrast in the subsurface or to an identifiable noise source, and then to mathematically remove it form the signal being analyzed. If one begins with the highest amplitude signal and removes that, then the signal is composed of lower amplitudes only. Continued cross-correlation and removal of the signals will allow discrimination of even the lower amplitude signals within the dataset. Comparison of short-time processing intervals with longer time processing intervals will allow the identification and amplification of even the weaker signals in the data.

The exact geometric relationship of the surface array elements is known. The location of the source is known. The angle of arrival of the incoming signal is known (or actually, the exact time delay and its changes over the area of the antenna array) is known. At the ultimate impedance contrast where P-waves are reflected, the angle of incidence is equal to the angle or reflection. It is then a geometry problem to convert the time delay which was derived from the signal cross-correlation to a direction. Of course, accurate velocity data would be required to convert the time delay to a direction with any reasonable degree of accuracy. This velocity data is derived from the dataset using a technique similar to seismic tomography and ray path analysis. The derived solution would be refined to a final value only after iterative analysis of the entire dataset including the results of the analysis after moving the source arrays several times, since there is not enough information from a single source and receiver experiment to derive an accurate velocity model for the entire illuminated portion of the Earth.

A seismic signal is modified in complex ways by the Earth filter. The degree of refraction of a signal at every impedance contrast is proportional to the difference in impedance (a function of velocity and density) between the two layers. It is also a given that the Earth is, for the most part, a layered medium. Mode conversions occur at all reflecting interfaces. The relative amplitudes of the resulting reflected, refracted and mode converted signals may be calculated. The surface direction that will be calculated given a velocity value for any given reflector for a specific source and antenna location will be essentially the result of the total impedance field through which the signal traveled, modified by the dip of the layered beds and the angle of the ultimate reflecting interface.

Parallax analysis is a critical technique in the evaluation of the dataset. The arrival angle of reflectors close to the surface will change rapidly across the antenna array from dipole to dipole. The arrival angle of reflectors from a great depth will change slowly across the antenna array from dipole to dipole. As the surface source is moved from place to place, the angles will change differentially, again with shallower sources moving more rapidly with respect to the background than the deeper sources, which themselves will be moving, but at a slower rate.

A single velocity model cannot uniquely solve a single dipole-reflection-source problem. As the signal is correlated across the antenna array, the angles will change do to the changing geometry of the system. For shallower reflecting interfaces, this will provide sufficient multiplicity of angles so that only a very narrow range of velocities will solve the problem. The velocity value should be sufficiently precise that lateral variations in the velocity field should be identifiable. As the source is moved, the multiplicity of angle measurements will yield a valid velocity field for the illuminated region below the antenna, with the most valid velocity values and variations being in the shallower section.

With increasing depth, the problem becomes more complex. The surface angle is the result of the geometry of the various surface source-receiver combinations, the dip of the intervening beds in the subsurface, the dip of the ultimate reflecting interface, and the sum result of all the velocity-density (impedance) contrasts and changes along the path of the wave as it passes through the Earth filter in both directions. The velocity of each layer and its lateral variations will therefore be less well known with increasing depth. Interval velocities would be established by comparison of the solved unique velocity for each reflecting layer with those both above and below.

The desired answer is the full solution of the three dimensional velocity field. This will allow the correct placement in depth of each of the received signals in the subsurface and the analysis of the individual characteristics of each signal. That is, amplitude, polarity, differential frequency attenuation, shear wave transmissibility and conversion modalities among others, could be examined.

The first of several principle noise reduction techniques which would be essential to the analysis of this dataset is the integration of the data from the array elements of the antenna over a long time interval. That is, as the target interval is identified, a longer correlation interval will be used to identify fully identify the target signal, its location or its attributes. The longer the interval, the "brighter" the signal from a particular source will become. Noise will tend to be canceled out by its very random nature and the signal will shine thorough. This, of course is one of the techniques used in astronomy to detect and analyze faint signals A recently developed technique called the non-redundant masking (NRM) procedure has been shown, in radio and optical astronomy, to increase the signal to noise ratio dramatically, and to allow as much as a 20-fold increase in resolution between two closely spaced point sources. There is also a related technique known as fully-filled aperture (FFA). It is also a computer intensive processing procedure to reduce unwanted noise and increase resolution of a signal. Both of these techniques may be able to be applied to the sort of signal that is acquired by the method proposed herein.

Noise in radio astronomy is similar in many ways to noise in seismic data. The basic technique of non-redundant masking is to correlate, not just dipole elements, but tripole receivers. This allows for the calculation of a "closure phase" wherein any spatially limited source of noise only generally effects one or two of the receivers at a time, and a coherent signal can be derived from the data. This technique should be directly applicable to the seismic method of source and receiver techniques proposed herein. The full mathematical development of this technique is given in the astronomical literature and may be adopted for use with seismic frequencies if the data is acquired properly.

Antennas for receipt of long duration monofrequency seismic signals may be of varying sizes depending on the objectives of the survey being conducted. Monetary constraints may force smaller seismic antennas. Increases signal strength may be obtained by enlarging the areal extent of the antenna while increasing the number of elements. This is equivalent to building larger mirrors to collect greater amounts of light in astronomy. This is also a technique for increasing the resolution of the antenna array to be able to distinguish between two closely spaced image points.

Movement of the surface antenna array at the completion of the acquisition of a series of distinct surface source locations has the effect of increasing the size of the antenna itself when the added datasets are fully merged into the original datasets. This movement has the effect of increasing the diameter of the antenna and the number of included elements. This movement also allows the deeper reflectors to be exposed to more energy form the input signals and therefore the returns from the deeper signals may be able to be combined with various datasets from other surface antenna locations and different source locations to enhance the signal and to analyze the signal from different angles. This is also a procedure that will allow the increase in resolution of the antenna array to closely spaced image points.

The entire seismic receiver antenna could be mathematically rotated to focus on each and every reflector identified in the dataset. This could be done in much the same way that a radio antenna is rotated to focus on a specific source point. This is accomplished on a dipole by dipole basis. Each element of each dipole is also a member of other dipoles and tripoles consisting of itself and every other element in the antenna array. The direction to each reflector is roughly the same for adjoining elements on the antenna. The search criteria for each spike could be therefore be automatically set by the program's algorithm.

Once each reflector is identified, the entire antenna could be "flexed" by differential time shifts on the correlations from element to element to focus the entire antenna on each reflector to determine its detailed attributes or for amplitude enhancement. The amount of each time shift required by the flexing is dependent on the angle of incidence and the velocity of the medium, The angle is known, the velocity is the solution.

The results of the focusing effect is multifaceted. First, and foremost, signal strength is magnified in the same way radio or light signals from a source are magnified by increasing antenna size. Secondly, the directional data for each targeted reflector is refined, since multiple measurements are available over the aerial extent of the antenna. This will allow angular resolution of the individual reflectors right to the theoretical limit of the antenna array, and to the extent of the Fresnel zone of the reflector. The flexing procedure described above would provide further refinement of the velocity field.

Figure 6A:
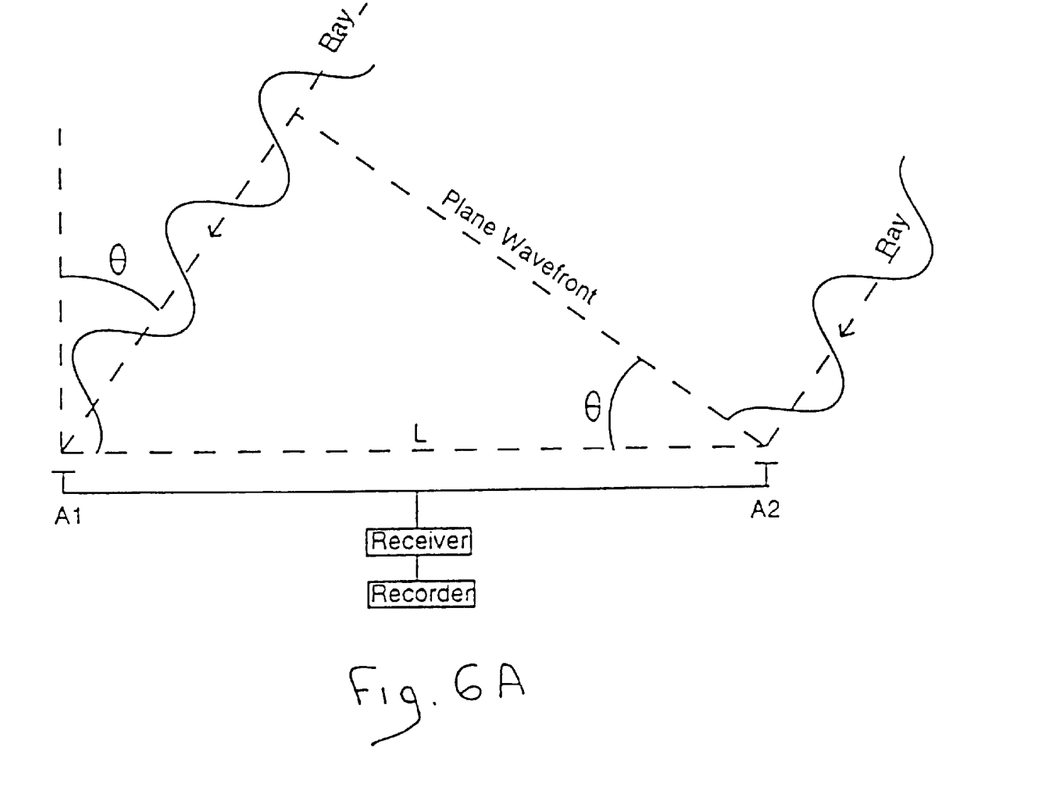
FIG. 6A illustrates astronomical interferometry.

FIG. 6A describes astronomical interferometry as a planar wavefront detected by two antenna elements A1 and A2, the phase delay being related to the angle of receipt of the ray.

Figure 6B:
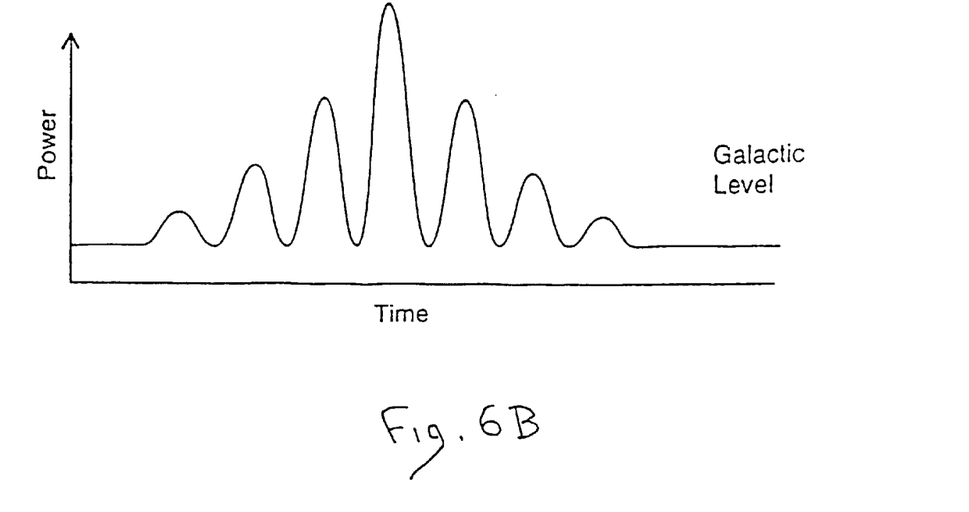
FIG. 6B illustrates phase shift caused by rotation of the earth.

In FIG. 6B, the rotation of the earth causes the phase of the incoming waves to change creating interference patterns which may be used to very accurately determine the direction of arrival of the raypaths. The subject method uses spherical divergence of the raypaths to artificially recreate the same sort of conditions so that the same analysis may be performed on seismic data.

Interferometry is a technique that takes into account the fact that signals recorded at adjacent antenna elements will be slightly out of phase due either to spherical divergence or a change in the geometry between the two elements. This technique is used in two ways by the present method. As the surface source is moved, the amplitude of the signal will increase or decrease for a given time delay for a given reflector due to signal interference or reinforcement. This pattern would be used to determine the center of the reflecting Fresnel zone.

Also, a modification of this technique would take advantage of each surface location and the fact of varying distances from the source by each element to determine the interference patterns for a given reflector across the antenna array. The center of the Fresnel zone would be located by the character of the interference patterns. The signal could then be collapsed to the originating point for each reflector for the purposes of display and analysis.

Detailed Interferometry-derived directional information might be obtainable to the maximum degree possible given the size of the various Fresnel zones on each distinct reflector and the scattering effects of the earth's velocity fields and impedance contrasts. Logically, since the current seismic method works, the problems above are apparently resolvable.

Many differences exist between the astronomical applications of interferometry and what is proposed here. Most have both positive and negative implications. For example, consider one major difference. Astronomical incoming signals may be assumed to be a plane wavefront whereas a seismic signal is decidedly nonplanar and curved. One way to force similarity would be to reduce the value of the separation between the array elements. Alternatively, the proposed method uses the nonplanarity of the received signal and the movement of the surface array to create the effect of interferometry.

The cross-correlation at each value of the received angle would give a single value for the power (amplitude) of the signal for a given point source. The cross-correlated amplitude with the adjacent receiver point would be equivalent to moving the source (changing the angle of data receipt). Plotting of these adjacent amplitude values for the entire 2-D array would create artificial interferometry patterns. Analysis of those patterns would yield better directional data and increase the angular resolution of the individual signals. Subsequent movement of the source and repetition of this exercise would create a massive dataset wherein full advantage would be taken of the spherical nature of the wavefronts.

This is a three dimensional technique, and should be displayed as a 3-D data cube with the individual reflections having been compressed to point and planar sources on a computer screen where the data could be moved, rotated, turned and displayed to identify the full structural complexity and the stratigraphic variability of the dataset. Various workstations available today are capable of the visualization of a dataset such as this. Display of the data in a manner where drilling locations may be identified are also possible through the use of a variety of hardcopy devices currently available.

Fluid content analysis should be possible with this method since different frequency waves react differently to the same formation when it contains gas, oil or water. By varying the source input frequencies in long duration, steady state mode, or by transmitting four for example, distinct frequencies, and by precisely making the determinations discussed above, differential attentions or spectral analysis should be obtainable. This technique has the potential to yield distinct spectral analysis criteria for direct detection of hydrocarbons.

Analysis of the Fresnel zone should yield some valuable information concerning the fluid content of the target reservoir. There should be two generally distinguishable modes of Fresnel zones. Normally the zone will appear as a ring, or semicircular feature which has a distinct width and radius. Normally the signal amplitude will be stronger on the inside of the zone. The reversed condition would occur where the stronger amplitudes are present on the outside of the semicircle. This is the result of the same physical properties that cause the amplitude with offset effect that is seen in conventional seismic processing.

This system will work best in regions of high complexity and dipping beds where the conventional techniques of the CDP method are less efficient. That is, it may work best in complex thrust provinces where the geology of the subsurface is extremely convoluted. In complex areas, the rocks are often highly faulted and tightly folded. These folds will decrease the size of point sources (Fresnel zones). Point sources from complex geology will often originate from out of the plane of the dipole-source section and should be resolvable by the use of tripole analysis. The greater the angular resolution as a result of complex geology, the better this system should work. They should be smaller, sharper and more distinct. Therefore the more complex the earth model, the better this methodology should work.

The system should be capable of increasing the strength of any signal that is present in the dataset. That is, if any signal at all is received from below a strong event such as salt, this method should be able to increase its signal to noise ratio to locate its position in three-dimensional space with a degree of accuracy heretofore unobtainable.

Full analysis of multiples should be possible with this method since multiples of different origins would appear with distinct characteristics. For example, interbed multiples would appear to be a series of very closely spaced reflector points with each being slightly offset in origination direction. They may not even be individually resolvable, but each should be weaker than the previous signal point. Multiples would react in a distinct way to the movement of the surface source and would be distinctly identifiable. The analysis of multiples should yield information on the impedance field of the Earth and should help the overall data analysis process.

Observation of both primary and shear waves should be obtainable from this system with ease. The full analysis of both P and all converted shear waves would be obtainable form the dataset.

The interpretation of this dataset would lend itself to the use of the techniques of fuzzy logic in the programming of the analysis algorithms for the method. Uncertainties abound and error ranges are the normal condition in this analysis. There will never be any exact answers, always uncertain and fuzzy answers will be produced, each within limited error ranges.

Another technique that would help in this analysis, and in fact may be vital, is the use of neural networks to develop and refine the velocity fields for both P and Shear waves and for sorting through the vast amount of data which will be produced and recorded in this method at every recording station.

The layering within the earth is generally recognized as being fractal in character. The signals recorded by the present system should be representative of this feature. The application of fractal analysis would therefore be of benefit in the processing and interpretation of the dataset produced by this method.

In summary, the resent invention is a three dimensional technique which does not depend on acquiring the travel time from the source to reflector to receiver. This data is not even necessarily gathered (though this system is fully capable of recording it). Instead, the primary data item is the recovery of the full-wave signal from all reflectors simultaneously and a dataset which will allow the direction and analysis of each reflector distinctly from the rest. Analysis of the full possible dataset deriving from a long duration, monofrequency input source will be possible with this methodology. This dataset will include P-waves, mode converted shear waves, diffractions, multiples and everything else recorded, including a full noise analysis.

The subject method is a new technique which is designed to take advantage of some of the basic earth physics which are not fully exploited by our current methodology. Strong similarities exist between this method and the techniques of 3D acquisition, but there are significant differences, and the consequences of those differences are potentially large, especially in certain situations where the current techniques operate poorly.

The present technique should complement conventional seismic and should make it possible to determine the location of all of the reflectors on the seismic section. Conventional seismic works best in shallowly dipping reflectors and simple geology. This system would work best in complex zones where the current system gives poor results. The better the angular distribution of the received signal, the better this system will be able to make the signal make sense.

The subject system would also work best in areas where the target signal is very weak for any number of reasons. If any signal can be recorded, a longer correlation interval may be used and the signal strengthened.

In summary, it is felt that the generation of long duration, monofrequency seismic signals which would be recorded by a highly directional receiving antenna array would have high potential benefit if the dataset can be processed and analyzed properly. A set of procedures that should accomplish this task are outlined herein. It is hoped that this system may prove to be beneficial and to be a profitable way to conduct the continuing search for hydrocarbon accumulations.

The present invention may be subject to many modifications and changes without departing from the spirit or essential characteristics thereof. The above description should therefor be considered in all respects as being illustrative and not restrictive as to the scope of the present invention as defined by the appended claims.

I claim:

1. A seismic surveying method comprising the steps of:
generating vibrations into an earth formation at a fixed surface location and at a constant frequency for from five minutes to thirty minutes or more which is many times greater than the time required for vibrational wave energy to be reflected back to the earth's surface from the deepest subsurface earth formation of interest for mineral exploration;
dejecting movement of earth formations at a spaced distance from the generating location on the earth's surface with a two dimensional array of three component geophones comprising a directional geophone array of known geometry and directional characteristics and generating seismic signals corresponding to the detected earth movement; and recording, simultaneously with said generating step the seismic signals continuously during the entire generating step beginning after a delay time of approximately fifteen seconds for reaching a steady state condition, said delay time being approximately equal to the time required for vibrational wave energy to be reflected back to the earth's surface from the deepest subsurface earth formations of interest for mineral exploration.

2. A method according to claim 1 further comprising the step of processing said recorded seismic signals to yield information relating to subsurface structure in the earth formation.

3. A method according to claim 2 further comprising the step of generating vibrations into the earth formation at a different surface location and at a different constant frequency from the initial constant frequency.

4. The method according to claim 3 in which the processing step includes:

determining the angle of incidence of arrival of vibrational wave fronts at said geophone array from the processing of the seismic signals.

* * * * *